United States Patent [19]

Rodney et al.

[11] Patent Number: 5,806,194
[45] Date of Patent: Sep. 15, 1998

[54] METHOD FOR CONDUCTING MOVING OR ROLLING CHECK SHOT FOR CORRECTING BOREHOLE AZIMUTH SURVEYS

[75] Inventors: Paul F. Rodney, Spring, Tex.; Anne Holmes, Cheltenham, England; Gordon M. Shiells, Aberdeenshire, Scotland

[73] Assignee: Baroid Technology, Inc., Houston, Tex.

[21] Appl. No.: 781,675

[22] Filed: Jan. 10, 1997

[51] Int. Cl.$^6$ ...................................................... E21B 47/02
[52] U.S. Cl. ................................................ 33/304; 33/313
[58] Field of Search ............................ 33/301, 302, 303, 33/304, 312, 313; 175/45, 61

[56] References Cited

U.S. PATENT DOCUMENTS

| | | | |
|---|---|---|---|
| Re. 33,708 | 10/1991 | Roesler | 33/304 |
| 3,587,175 | 6/1971 | Armistead | 33/312 |
| 4,682,421 | 7/1987 | van Dongen et al. | 33/302 |
| 4,709,486 | 12/1987 | Walters | 33/304 |
| 4,761,889 | 8/1988 | Cobern et al. | 33/302 |
| 4,813,274 | 3/1989 | DiPersio et al. | 33/313 |
| 4,819,336 | 4/1989 | Russell | 33/304 |
| 4,956,921 | 9/1990 | Coles | 33/304 |
| 4,999,920 | 3/1991 | Russell et al. | 33/312 |
| 5,064,006 | 11/1991 | Waters et al. | 175/45 |
| 5,103,177 | 4/1992 | Russell et al. | 175/45 |
| 5,155,916 | 10/1992 | Engebretson | 33/313 |
| 5,172,480 | 12/1992 | Labuc et al. | 33/304 |
| 5,321,893 | 6/1994 | Engebretson | 33/313 |
| 5,398,421 | 3/1995 | Nicolle et al. | 33/302 |
| 5,435,069 | 7/1995 | Nicholson | 33/304 |
| 5,452,518 | 9/1995 | DiPersio | 33/304 |
| 5,564,193 | 10/1996 | Brooks | 33/302 |

*Primary Examiner*—G. Bradley Bennett
*Attorney, Agent, or Firm*—Browning Bushman

[57] ABSTRACT

A method is disclosed for correcting for the distorting effect of cross-axial magnetic interference on the readings of a well survey tool using a reduced number of measurements and measuring locations. A well survey tool connected to a drill string assembly measures the gravitational and distorted terrestrial magnetic fields at two or more axially displaced locations in an axially extending well bore. The measurements are made from two or more different orientations (tool faces) of the tool about the well axis. Initial values for the tool inclination, azimuth and tool face angle are first determined without correction for the cross-axial magnetic interference introduced by the drill string assembly and the survey tool. Measurements made at each location and tool face are referred to the toots coordinate system and variations introduced by the different tool face angles are used to estimate the cross-axial interference. The estimated interference is used to improve the estimate of the azimuth. Where the azimuth and inclination vary between measurement, the process is iterated until a desired degree of convergence is reached or until no further improvement in the azimuth is possible. Where azimuth and inclination remain substantially constant between readings, the azimuth correction is directly calculated without iteration. Where the cross-axial interference varies slowly and systematically between measurements, a variational trend in the cross-axial interference is calculated with trend analysis techniques. Where rapid variations between cross-axial measurements are detected such that the only information obtained is that the cross interference exists, the method is used to determine that the related azimuth calculations may be identified as being faulty. After correction for the cross-axial interference, the existence of an external magnetic field acting on the measurements is also determined from residual error that varies in magnitude and direction along the well bore trajectory.

19 Claims, No Drawings

METHOD FOR CONDUCTING MOVING OR ROLLING CHECK SHOT FOR CORRECTING BOREHOLE AZIMUTH SURVEYS

BACKGROUND OF THE INVENTION

Field of the Invention

The present invention relates generally to methods used to determine the path of a well bore that extends into the Earth. More particularly, the present invention pertains to a method that uses a reduced number of measurements to correct azimuth determinations made from terrestrial magnetic readings distorted by the magnetic interference produced by the survey tool and drill string assembly.

Determinations of the inclination and azimuth of a well bore are customarily made by measuring gravitational and terrestrial magnetic fields existing in the well bore. The terrestrial components of the magnetic field are distorted by the magnetic fields associated with the drill string assembly and the survey tool. This distortion, together with measurement errors and random noise errors produce errors in the determined value of the azimuth. The prior art has suggested a number of methods and apparatus for reducing the effects of the magnetic error in the determination of azimuth.

In dealing with the magnetic measurements, it is customary to define the magnetic field in terms of its components in the coordinate system of the survey tool. The central axis of the tool is commonly designated as the z-axis. Mutually perpendicular x and y axes intersect the z-axis and lie in a plane perpendicular to the z-axis. The x and y components of the interfering magnetic field are referred to as the cross-axial or x–y interference. The z component of the interference is referred to as the axial or z axis interference.

One commonly employed technique for compensating for the effects of the magnetic interference attributable to the survey tool and drill string requires that as many as five or more readings at different tool face angles be made at a single axial location within the well bore. These measurements are compared to identify the strength and direction of the interfering magnetic field. Subsequent azimuth determinations are corrected by adjusting the azimuth calculations for the effect of this known interference. Methods of this type are described in U.S. Pat. No. 4,682,42 to Van dongen et al and U.S. Pat. No. 5,564,193 to Brooks.

While these patented processes are direct and easily implemented, the correction technique may require as much as ten minutes per measurement resulting in undesirably long delays in the drilling of the well. These delays are particularly undesirable where the well bore may be jeopardized by drilling pauses and where the drilling is being done from rigs that cost thousands of dollars per hour to operate.

Several methods for correcting for magnetic interference have been suggested in which fewer measurements are made at different axial locations to reduce the time loss of the non-drilling intervals. In certain of these methods, measurements are made during the time the drilling operation is temporarily stopped to add a length of drill pipe to the drilling assembly. Such methods are described for example in U.S. Pat. No. 5,435,069 to Nicholson, U.S. Pat. No. 5,398,421 to Nicolle et al, U.S. Pat. No. 5,321,893 to Engebretson, and U.S. Pat. No. 4,709,486 to Walters.

The method of the '069 patent requires that the azimuth be determined at each axial location without applying a correction for magnetic interference. The azimuth is determined algebraically with the result that the method can be applied, at most, to three measurements at a time without overdetermining the equations. In practice, reliable estimates of magnetic interference require more than three measurements. Additionally, in the '069 method, when only two measurement points are employed, it is necessary to add a consistency condition in order to have a sufficient number of equations to solve for the unknowns. While either of the '069 techniques may work well in the absence of measurement noise, the presence of such measurement noise will significantly degrade the results.

The method taught by the '893 patent is concerned with axial interference rather than cross-axial interference. The method requires the explicit use of a model of drill string magnetization and also requires the use of measurement vectors and measurement matrices.

The '486 patent method also deals only with axial magnetic interference and treats the cross-axial interference as non-existent. The multiple measurements used in the method must be made at noncollinear points and are used to determine the algebraic sign of the calculated tool-axis magnetic field.

The '421 patent method describes a technique for correcting for the cross-axial and axial magnetic disturbance using measurements taken at different axial locations in the well bore and at random tool face angles. The method requires that the x, y and z axis components of the magnetic field be measured at each measuring point. The interference is determined using a statistical method in which a correlation is made between the measured field and a series of magnetic measurements obtained randomly.

To the extent that the '421 method employs the z-axis measurements in determining the cross-axis correction, the resultant calculations of azimuth are subject to producing erroneous results. This follows from the fact that, if interference exists in the x and y axes, it almost certainly exists in the z axis. The z axis readings are thus subject to being corrupt and their use in the calculations of the azimuth will also produce corrupted azimuth determinations. Since the z axis interference changes only very slowly as the survey tool progresses down the borehole, the z axis reading can not be of any use in determining the interference. Moreover, while the method described in the '421 patent employs a statistical solution, the method lacks an iterative solution step that may be used to improve the azimuth calculations when the inclination and azimuth vary substantially between measurements.

SUMMARY OF THE INVENTION

In the most basic steps of the methods, measurements of the gravitational and cross axis magnetic fields acting on the survey tool are made at two differing tool face angles in as few as two axial locations in the well bore. The variation in the cross-axis magnetic field measured at the different tool face angles is used to statistically estimate the cross-axis interference. The estimated interference is used to improve the azimuth calculation at each axial location. Where the inclination or azimuth change between measurements, the statistical estimates and azimuth calculation are iterated to further improve the azimuth calculation. In the implementation of the method, it will be understood that the method steps are applied to more than the minimum measurements to obtain improved accuracy.

Where the azimuth and inclination between successive survey locations are substantially constant, the method is used to directly calculate corrected azimuth without iteration.

The characteristics of the cross-axial magnetic field are evaluated to improve survey results. In situations where the interfering field varies slowly from one measuring location to another, it may be treated as a constant to permit simplification of the calculations.

Where the cross-axial field varies slowly and systematically, a trend in the cross-axial field is calculated using established mathematical trend analysis techniques.

Where the cross-axial field varies rapidly from one measuring location to another such that it is only possible to determine that the interference exists, this determination is used to identify faulty surveys.

After all corrections for cross-axial interference have been made, the existence of an external field may be detected from the presence of residual error that varies in magnitude and direction along the borehole trajectory.

From the foregoing, it will be understood that a primary object of the present invention is to provide a method for correcting cross-axial magnetic interference produced by a drill string assembly and survey tool using cross-axial measurements at a minimum of two differing well bore locations and two differing tool face angles without regard to the axial component of the magnetic field.

Another object of the present invention is to iterate statistical adjustments of the cross-axial magnetic measurements to compensate for changes in the inclination and azimuth of the survey tool at each of the two different measuring locations to improve initial azimuth estimates.

Yet another object of the present invention is to provide a method for directly calculating the cross-axial interference in a well survey tool where the inclination and azimuth of the tool remain substantially constant from one measuring point to the next.

Another important object of the present invention is to employ the determined values of cross-axial interference in situations where the interference changes in the tool axis at different measuring locations to calculate the trend in the change of the cross-axial field.

Still another object of the present invention is to determine the presence of rapidly changing cross-axial interference that will identify faulty surveys.

These and other features, objects and advantages of the methods of the present invention will be more fully appreciated and understood by reference to the following description and claims.

DESCRIPTION OF THE PREFERRED EMBODIMENTS

A basic principle employed in the present invention is that by referring all measurements made by the survey tool to the tool coordinate system, it is possible to use the variations introduced by the different tool face angles to calculate cross-axial interference. In this method, it is assumed that the magnetic interference is due to the magnetic field properties introduced by the drill string assembly and the survey tool. Accordingly the magnitude and direction of the introduced interference remains fairly constant relative to the tool's coordinate system even as the tool is rotated to different tool face angles or is moved to different axial positions within the well bore.

In the preferred embodiments of the method, the single collar solution such as taught in U.S. Pat. No. Re. 33,708, or an equivalent method, is used to obtain the azimuth.

The measurements obtained at the various survey stations in the process are mapped to a first survey station that becomes a "reference" station. This mapping step involves a knowledge of the tool inclination, tool face angle and azimuth at each station.

In the first pass, no correction is made for magnetic interference in determining the azimuth. After this, the magnetic interference is estimated and the estimate of the azimuth is improved. The process is iterated until the desired degree of convergence is reached or until no further improvement in the azimuth is possible, as would be indicated for example by the azimuth cycling over two or more numbers as the iterations are performed.

As the method of the present invention approaches a solution, it will be demonstrated that the equations for determining the cross-axial interference reduce to the following forms:

$$B_{ox} = \frac{1}{N} \sum_{j=1}^{N} B_{jx} - \hat{B}_{ejx}$$

$$B_{oy} = \frac{1}{N} \sum_{j=1}^{N} B_{jy} - \hat{B}_{ejy}$$

where $B_{ox}$ is the cross-axial x-axis interference, $B_{oy}$ is the cross-axial y-axis interference, $B_{jx}$ is the $j^{th}$ measurement of the x-component of the field in the tool's coordinate system, $B_{jy}$ is the $j^{th}$ measurement of the y-component of the field in the tool's coordinate system, where $B_{ox}$ is the cross-axial x-axis interference, $B_{oy}$ is the cross-axial y-axis interference, $B_{jx}$ is the $j^{th}$ measurement of the x-component of the field in the tool's coordinate system, $B_{jy}$ is the $j^{th}$ measurement of the y-component of the field in the tool's coordinate system, $\hat{B}_{ejx}$ is the estimated x-component of the earth's magnetic field in the tool coordinate system at station j and $\hat{B}_{ejy}$ is the y-component of the earth's magnetic field in the tool coordinate system of station j.

Details of the technique are as follows:

Suppose there exists a set {i} of surveys where i is a member of N and there exists a constant magnetic affect on the tool's x–y axis. The effects of the z-axis interference are not considered in the present method. It may be assumed that z-axis interference is dealt with by some other means as, e.g., the single collar method as more fully described in U.S. Pat. No. Re. 33,708.

Let the $\vec{B}$ field of the earth at station j be $\vec{B}_{ej}$, the observed field will be $\vec{B}_j$, and the interfering field will be $\vec{B}_0 = \vec{B}_{ox}\hat{i} + \vec{B}_{oy}\hat{i}$. It will be assumed that if $\vec{B}_0$ varies, it varies slowly and can be taken to be a constant in the tool's coordinate system. We will need one other quantity: let $\hat{B}_{ej}$ be an estimator of $\vec{B}_{ej}$ based upon our "best" estimate of the azimuth $\psi$.

While we are able to estimate $\psi_j$, we do not know it unless we know $\vec{B}_0$. On the other hand, we do know the inclination angle $\theta_j$ and the tool face angle $\phi_j$.

There is associated with any measurement of $\vec{B}$ at station j an error $\vec{E}_j$ so that we can write $$\vec{B}_j - \vec{B}_o = \vec{B}_{ej} + \vec{E}_j$$

It will be assumed that the $\vec{E}_j$ are randomly distributed error vectors.

Let I be defined as $$\sum_{j=1}^{N} |\vec{E}_j|^2$$

Or $I = \sum_{j=1}^{N} |\vec{B}_j - \vec{B}_0 - \vec{B}_{ej}|^2$

If we knew $\Psi_j$ exactly, we would know $B_{ejx}$, $B_{ejy}$ exactly. However, $\Psi_j$ is calculated from corrupted data. It is our purpose to estimate $\Psi_j$ from $\vec{B}_j$, $\theta_j$, $\phi_j$, then iteratively solve for $B_{ox}$ and $B_{oy}$, at each step refining our knowledge of $\Psi_j$. Thus, in I, we must replace $B_{ejx}$, $B_{ejy}$ by their estimators $\hat{B}_{ejx}$ and $\hat{B}_{ejy}$.

Then $$I = \sum_{j=1}^{N} [(B_{jx} - \hat{B}_{ejx} - B_{ox})^2 + (B_{jy} - \hat{B}_{ejy} - B_{oy})^2]$$

Seeking extrema of I, we should be able to solve for $B_{ox}$ and $B_{oy}$. Note that this will be an iterative solution in that we estimate $B_{ox}$, $B_{oy}$, then re-estimate $\Psi$, $\hat{B}_{ej}$, etc.

$$\frac{\partial I}{\partial B_{ox}} = 0 \rightarrow \sum_{j=1}^{N} \left[ \left(1 + \frac{\partial \hat{B}_{ejx}}{\partial B_{ox}}\right)(B_{jx} \hat{B}_{ejx} - B_{ox}) + \frac{\partial \hat{B}_{ejy}}{\partial B_{ox}}(B_{jy} - \hat{B}_{ejy} - B_{oy}) \right] = 0 \quad (1)$$

$$\frac{\partial I}{\partial B_{oy}} = 0 \rightarrow \sum_{j=1}^{N} \left[ \left(\frac{\partial \hat{B}_{ejx}}{\partial B_{oy}}\right)(B_{jx} - \hat{B}_{ejx} - B_{ox}) + \left(1 + \frac{\partial \hat{B}_{ejy}}{\partial B_{oy}}\right)(B_{jy} - \hat{B}_{ejy} - B_{oy}) \right] = 0 \quad (2)$$

The $\hat{B}_{ej}$ are to be estimated from $\theta_j$, $\phi_j$ and the measured fields, or equivalently from the estimated azimuth $\psi_j$; we cannot estimate by plugging back into the general azimuth equations since this would be circular.

Now as is known, in the NEV coordinate system where $\Phi$ is the rotational matrix, $\theta$ is the inclination, and $\psi$ is the azimuth:

$$\vec{B}_{xyz} = \Phi^{-1} \theta \psi^{-1} \vec{B}_{NEV}$$

or $$\begin{pmatrix} B_x \\ B_y \\ B_z \end{pmatrix} = \begin{pmatrix} [\cos\theta \cos\phi \cos\psi - \sin\phi \sin\psi] & [\cos\phi \cos\theta \sin\psi + \sin\phi \cos\psi] & -\cos\phi \sin\theta \\ [-\cos\theta \sin\phi \cos\psi - \cos\phi \sin\psi] & [-\sin\phi \sin\theta \sin\psi + \cos\phi \cos\psi] & \sin\phi \sin\theta \\ \sin\phi \cos\psi & \sin\theta \sin\psi & \cos\theta \end{pmatrix} \begin{pmatrix} B_N \\ 0 \\ B_V \end{pmatrix}$$

$(B_E \equiv 0)$ (A) $B_x = [\cos\theta \cos\phi \cos\psi - \sin\phi \sin\psi] B_N - \cos\phi \sin\theta B_V$
(B) $B_y = [-\cos\theta \sin\phi \cos\psi - \cos\theta \sin\psi] B_N + \sin\phi \sin\theta B_V$ These equations will be used to estimate $\hat{B}_{ejx}$ and $\hat{B}_{ejy}$. $\psi_j$ was calculated from measured values.

$$\frac{\partial \hat{B}_{ejx}}{\partial B_{ox}} = \left[ \cos\theta_j \cos\phi_j \frac{\partial[\cos\psi_j]}{\partial B_{ox}} - \sin\phi_j \frac{\partial[\sin\psi_j]}{\partial B_{ox}} \right] B_N \quad (C)$$

($\phi_j$ and $\phi_j$ are independent of $B_{ox}$ and $B_{oy}$)
Likewise, $$\frac{\partial \hat{B}_{ejx}}{\partial B_{oy}} = \left[ \cos\theta_j \cos\phi_j \frac{\partial[\cos\psi_j]}{\partial B_{oy}} - \sin\phi_j \frac{\partial[\sin\psi_j]}{\partial B_{oy}} \right] B_N \quad (D)$$

$$\frac{\partial \hat{B}_y}{\partial B_{ox}} = \left[ -\cos\theta_j \sin\phi_j \frac{\partial[\cos\psi_j]}{\partial B_{ox}} - \cos\phi_j \frac{\partial[\sin\psi_j]}{\partial B_{ox}} \right] B_N \quad (E)$$

$$\frac{\partial \hat{B}_y}{\partial B_{oy}} = \left[ -\cos\theta_j \sin\phi_j \frac{\partial[\cos\psi_j]}{\partial B_{oy}} - \cos\phi_j \frac{\partial[\sin\psi_j]}{\partial B_{oy}} \right] B_N \quad (F)$$

Therefore we must evaluate $$\frac{\partial[\cos\psi_j]}{\partial B_{ox}}, \frac{\partial[\sin\psi_j]}{\partial B_{ox}}, \frac{\partial[\cos\psi_j]}{\partial B_{oy}}, \frac{\partial[\sin\psi_j]}{\partial B_{oy}}.$$

We cannot also estimate these from equations (A) and (B) as this would be circular; we can, however, get help in finding these derivatives from the other equations.

Note that (G) $B_Z = B_N \sin\theta \cos\psi + B_V \cos\theta$

Now, $B_Z$, $\theta$, $B_N$ and $B_V$ are independent of $B_{ox}$ and $B_{oy}$ $\rightarrow$ $$\frac{\partial B_z}{\partial B_{ox}} = 0 = B_N \sin\theta \frac{\partial \cos\psi}{\partial B_{ox}} \rightarrow \frac{\partial \cos\psi}{\partial B_{ox}} = \frac{\partial \cos\psi}{\partial B_{oy}} = 0$$

In general, we would not use (G) to find $\psi$, but if we had used (G), all of the partials must vanish for if $$\frac{\partial \cos\psi}{\partial \phi} = 0, \text{ then } \frac{\partial \sin\psi}{\partial \phi} = -\frac{\sin\psi}{\cos\psi} \frac{\partial \cos\psi}{\partial \phi} = 0$$

In this case, the solution is quite simple:

$$\sum_{j=1}^{N} (B_{jx} - \hat{B}_{ejx} - B_{ox}) = 0$$

$$\sum_{j=1}^{N} (B_{jy} - \hat{B}_{ejy} - B_{oy}) = 0$$

for which one can easily solve for $B_{ox}$ and $B_{oy}$ and iterate the solution to get a new estimate of $\psi$ and hence of $\hat{B}_{ejx}$ and $\hat{B}_{ejy}$.

The iteration may be performed as follows:

$$\psi = \tan^{-1}\left[\frac{-[B_x\sin\phi + B_y\cos\phi]}{[B_x\cos\phi - B_y\sin\theta]\cos\theta + B_z\sin\theta}\right]$$

$$\frac{\partial\psi}{\partial B_{ox}} = \frac{1}{1+\tan^2\psi}\left[\frac{-\sin\phi}{[B_x\cos\phi - B_y\sin\phi]\cos\theta + B_Z\sin\theta} + \frac{[B_x\sin\phi + B_y\cos\phi]\cos\phi\cos\theta}{[B_x\cos\phi - B_y\sin\phi]\cos\theta + B_z\sin\theta]^2}\right]$$

$$\frac{\partial\psi}{\partial B_{oy}} = \frac{1}{1+\tan^2\psi}\left[\frac{-\cos\phi}{[B_x\cos\phi - B_y\sin\phi]\cos\theta + B_Z\sin\theta} - \frac{[B_x\sin\phi + B_y\cos\phi]\sin\phi\cos\theta}{[B_x\cos\phi - B_y\sin\phi]\cos\theta + B_z\sin\theta]^2}\right]$$

Returning to equations (C), (D), (E), (F), $$\frac{\partial\hat{B}_{ejx}}{\partial B_{ox}} = B_N[-\cos\theta_j\cos\phi_j\sin\psi_j - \sin\phi_j\cos\psi_j]\frac{\partial\psi_j}{\partial B_{ox}} \quad (3)$$

$$\frac{\partial\hat{B}_{ejx}}{\partial B_{oy}} = B_N[-\cos\theta_j\cos\phi_j\sin\psi_j - \sin\phi_j\cos\psi_j]\frac{\partial\psi_j}{\partial B_{oy}} \quad (4)$$

$$\frac{\partial\hat{B}_y}{\partial B_{ox}} = B_N[\cos\theta_j\cos\phi_j\sin\psi_j - \cos\phi_j\cos\psi_j]\frac{\partial\psi_j}{\partial B_{ox}} \quad (5)$$

$$\frac{\partial\hat{B}_{ejy}}{\partial B_{oy}} = B_N[\cos\theta_j\sin\phi_j\sin\psi_j - \cos\phi_j\cos\psi_j]\frac{\partial\psi_j}{\partial B_{oy}} \quad (6)$$

We note that we can use the formula for $\psi$ to make a few further simplifications, which will also improve execution time.

$$\frac{\partial\psi_j}{\partial B_{ox}} = \frac{\tan\psi_j}{1+\tan^2\psi_j}\left[\frac{\sin\phi_j}{B_{xj}\sin\phi_j + B_{yj}\cos\phi_j} - \frac{\cos\phi_j\cos\theta_j}{B_{xj}\cos\phi_j - B_{yj}\sin\phi_j]\cos\theta_j + B_{zj}\sin\phi_j}\right] \quad (7)$$

Similarly:

$$\frac{\partial\psi_j}{\partial B_{ox}} = \frac{\tan\psi_j}{1+\tan^2\psi_j}\left[\frac{-\cos\phi_j}{B_{xj}\sin\phi_j + B_{yj}\cos\phi_j} + \frac{\sin\phi_j\cos\theta_j}{B_{xj}\cos\phi_j - B_{yj}\sin\phi_j]\cos\theta_j + B_{zj}\sin\phi_j}\right] \quad (8)$$

Since $$\frac{\tan\psi}{1\tan^2\psi}$$

will not cancel out of the governing equations it is best, then to calculate values in equations (7) and (8), use the values in equations (3)→(6) and then use equations (3)→(6) in equations (1) and (2).

(1) and (2) can be arranged as follows:

$$B_{ox}\sum_{j=1}^{N}\left(1+\frac{\partial\hat{B}_{ejx}}{\partial B_{ox}}\right) + B_{oy}\sum_{j=1}^{N}\frac{\partial\hat{B}_{ejy}}{\partial B_{ox}} = \quad (9)$$

$$\sum_{j=1}^{N}\left[\left(1+\frac{\partial\hat{B}_{ejx}}{\partial B_{ox}}\right)(B_{jx} - \hat{B}_{ejx}) + \frac{\partial\hat{B}_{ejy}}{\partial B_{ox}}(B_{jy} - \hat{B}_{ejy})\right]$$

$$B_{ox}\sum_{j=1}^{N}\frac{\partial\hat{B}_{ejx}}{\partial B_{ox}} + B_{oy}\sum_{j=1}^{N}\left(1+\frac{\partial\hat{B}_{ejy}}{\partial B_{ox}}\right) = \quad (10)$$

$$\sum_{j=1}^{N}\left[\frac{\partial\hat{B}_{ejx}}{\partial B_{ox}}(B_{jx} - \hat{B}_{ejx}) + \left(1+\frac{\partial\hat{B}_{ejy}}{\partial B_{ox}}\right)(B_{jy} - \hat{B}_{ejy})\right]$$

In general, whatever method is used to solve for $\psi_j$ should be used to find $$\frac{\partial\psi_j}{\partial B_{ox}}, \frac{\partial\psi_j}{\partial B_{oy}}$$

and hence $$\frac{\partial\hat{B}_{ejx}}{\partial B_{ox}}, \frac{\partial\hat{B}_{ejx}}{\partial B_{oy}}, \frac{\partial\hat{B}_{ejy}}{\partial B_{ox}}, \text{ and } \frac{\partial\hat{B}_{ejy}}{\partial B_{oy}}.$$

The key is not to use the same equation for $\psi$ as for $B_{ejx,y}$.

It will be understood that other azimuth calculation methods may be used to obtain these derivatives.

Equations (9) and (10) can be solved simultaneously, then the process defined through equations (1)–(10) can be iterated. Note that an iterative solution for z-axis interference could also be included as a separate step.

Finally, in the one special solution case where the iteration leads to a solution, it should eventually converge to the form of equations (11) and (12) below, so equations (11) and (12) may be good working approximations.

$$B_{ox} = \frac{1}{N}\sum_{j=1}^{N}(B_{jx} - \hat{B}_{ejx}) \quad (11)$$

$$B_{oy} = \frac{1}{N}\sum_{j=1}^{N}(B_{jy} - \hat{B}_{ejy}) \quad (12)$$

While the basic steps of the method have been shown to be operative with measurement taken from as few as two tool face angles and two axial locations, it will be understood that the accuracy and quality of results obtained using the method are improved by employing measurements from more than the minimum number of tool face angles and axial locations. In a practical working application, the method is advantageously applied to all of the data gathered during the survey.

A special application of the method may be employed in situations in which it is assumed that the azimuth and inclination of the tool remain similar for all tool face angles such that:

(13) $(b_x - \Delta b_x)^2 + (b_y - \Delta b_y)^2 = B^2 * \sin^2(\theta_B) = $ Constant for small changes in inclination and azimuth. As used in equation (13), B is the true value of the earth's magnetic field, $\theta_B$ is the true value of magnetic inclination, $b_x$ and $b_y$ are the measured components of the earth's magnetic field in the tool's x and y axis, and $\Delta b_x$ and $\Delta b_y$ are magnetic interference in the x, y axes.

A best fit, in the least squares sense, can be performed for a minimum of 3 successive survey stations with similar inclinations and azimuths using

(14) $b_x^2 + b_y^2 - 2*\Delta b_x*b_x - 2*\Delta b_y*b_y + (\Delta b_x)^2 + (\Delta b_y)^2 - B^2*\sin^2(\theta_B) = 0$ In summary, it will be understood that the inventors hereof have disclosed an iterative method for compensation for cross-axial magnetic interference and bias errors using measurements at multiple points along a well bore.

The method of the present invention compensates for cross-axial magnetic interference and bias errors using measurements at multiple points along a well bore that need not be at the same inclination.

A method of the present invention further permits the determination of trends in cross-axial magnetic interference and bias errors using measurements along a well bore and compensating for these errors.

Another method of the invention includes the step of detecting the presence of random cross-axial magnetic interference and/or bias errors. Where the cross-axial field is determined to vary rapidly between measuring stations such that it is only possible to determine that there is interference, without being able to quantify the direction or magnitude of the interference, this information is employed to identify faulty surveys taken at the measuring stations.

Finally, a method of the invention includes the steps of making all corrections for cross-axial interference and identifying the presence of a residual error that is variable in magnitude and direction along the bore hole trajectory to establish the presence of an external field.

While preferred embodiments of the methods of the present invention have been described in detail herein, it will be understood that the described steps of the methods may be altered or supplemented without departing from the spirit and scope of the invention which is defined in the following claims.

What is claimed is:

1. A method of correcting for the effects of cross-axial magnetic interference on the azimuth measurements made in a well bore by a well bore survey tool comprising the steps of:
   (a) measuring gravitational and magnetic fields at a first axial well bore location and at a first tool face angle;
   (b) measuring gravitational and magnetic fields at a second axial well bore location and at a second tool face angle;
   (c) estimating the azimuth of the tool at said first location using the measurements taken at said first location;
   (d) estimating the components of the cross-axial magnetic interference from the magnetic measurements made at said first and second locations; and
   (e) re-estimating the azimuth estimate made for said first location using the estimated cross-axial magnetic interference components without regard to the axial interference component.

2. The method as defined in claim 1 further comprising the steps of:
   (a) statistically adjusting the cross-axial magnetic measurements made at said first and second locations to more closely determine the cross-axial interference; and
   (b) employing the statistically adjusted magnetic measurements to improve the accuracy of the azimuth estimate made at said first and second locations.

3. The method as defined in claim 2 further comprising iterating the steps of statistically adjusting the cross-axial measurements and re-estimating the azimuth to further improve the accuracy of the azimuth estimation at each of said locations.

4. The method as defined in claim 1 further comprising the steps of:
   (a) maintaining a substantially constant tool inclination and azimuth between said first and second locations;
   (b) calculating the cross-axial interference from the measurements made at said first and second locations; and
   (c) correcting the azimuth estimate at said first and second locations using the calculated values of said cross-axial interference.

5. The method as defined in claim 1 further comprising the steps of
   (a) comparing the cross-axial interference between said first and second locations to detect a small order change in value of said cross-axial interference; and
   (b) determining the trend of change in said cross-axial interference from the detected change.

6. The method as defined in claim 1 further comprising the steps of:
   (a) comparing the cross-axial interference between said first and second locations to detect a large order change in value of said cross-axial interference; and
   (b) identifying azimuth determinations made at said first and second locations as being faulty.

7. The method as defined in claim 1 further comprising the step of determining the presence of an external magnetic field acting on the magnetic measurements by detecting residual cross-axial error that varies in magnitude and direction at each of said first and second locations.

8. A method of correcting for the effects of cross-axial magnetic interference on the azimuth measurements made in a well bore by a well bore survey tool comprising the steps of:
   (a) measuring the magnetic and gravitational fields in at least three successive, axially spaced survey locations in said well bore with similar inclinations and azimuths and differing tool face angles;
   (b) determining the cross-axial magnetic interference using the measurements obtained at each survey location; and
   (c) correcting the azimuth calculations at each survey location using the determined value of cross-axial interference.

9. The method as defined in claim 8 further comprising the steps of:
   determining the cross-axial magnetic interference using a least squares best fit calculation.

10. The method as defined in claim 8 further comprising the step of determining the cross-axial magnetic interference using $$b_x^2 + b_y^2 - 2 \cdot \Delta b_x \cdot b_x - 2 \cdot \Delta b_y \cdot b_y + (\Delta b_x)^2 + (\Delta b_y)^2 - B^2 \cdot \sin^2(\theta_B) = 0$$

where B is the true value of the earth's magnetic field, $\theta_B$ is the true value of magnetic inclination, $b_x$ and $b_y$ are the measured components of the earth's magnetic field in the tool's x and y axis, and $\Delta b_x$ and $\Delta b_y$ are magnetic interference in the x, y axes.

11. A method of evaluating cross-axial magnetic interference in the measurements made by a well bore survey tool in a well bore comprising the steps of:
   (a) measuring the gravitational and magnetic fields at first and second axially spaced locations within said well bore;
   (b) estimating the value of the cross-axial interference at said first and second locations;
   (c) comparing the value of said cross-axial interference at said first location with the value of said cross-axial interference at said second location to determine a trend in the change of cross-axial interference along the axis of said well bore.

12. A method of evaluating cross-axial magnetic interference in the measurements made by a well bore survey tool in a well bore comprising the steps of:
   (a) measuring the gravitational and magnetic fields at first and second axially spaced locations within the well bore;

(b) estimating the value of the cross-axial interference at said first and second locations;

(c) comparing the value of said cross-axial interference at said first location with the value of said cross-axial interference at said second location to detect changes in cross-axial interference of sufficient magnitude to signify a faulty survey.

13. A method of evaluating cross-axial magnetic interference in the measurements made by a well bore survey tool in a well bore comprising the steps of:

(a) measuring the gravitational and magnetic field at first and second axially spaced locations within the well bore;

(b) determining the value of the cross-axial interference at said first and second locations; and (c) evaluating residual error that varies in magnitude and direction along the well bore trajectory to detect an external field.

14. A method of correcting for the effects of cross-axial magnetic interference on the azimuth measurements made in a well bore by a well bore survey tool comprising the steps of:

(a) measuring gravitational and magnetic fields at two or more different axial locations and at differing tool face angles within said well bore;

(b) estimating the azimuth at each of said locations;

(c) estimating the components of the cross-axial magnetic interference from the measurements made at said locations; and (d) re-estimating the azimuth estimates made for said locations using the estimated cross-axial magnetic interference components.

15. A method as defined in claim 14 further comprising the steps of:

(a) measuring gravitational and magnetic fields at three or more different axial locations;

(b) estimating the azimuth at each of said locations;

(c) estimating the components of the cross-axial magnetic interference from the measurements made at said locations; and (d) re-estimating the azimuth estimate made for said locations using the estimated cross-axial magnetic interference components without regard to the axial interference.

16. The method as defined in claim 14 further comprising the steps of:

(a) statistically adjusting the cross-axial magnetic measurements made at said locations to more closely determine the cross-axial interference; and (b) employing the statistically adjusted magnetic measurements to improve the accuracy of the azimuth estimates made at said locations.

17. The method as defined in claim 14 further comprising the steps of:

(a) statistically adjusting the cross-axial magnetic measurements made at said locations to more closely determine the cross-axial interference; and (b) employing the statistically adjusted magnetic measurements to improve the accuracy of the azimuth estimates made at said locations.

18. The method as defined in claim 17 further comprising iterating the steps of statistically adjusting the cross-axial measurements and re-estimating the azimuth to further improve the accuracy of the azimuth estimation at each of said locations.

19. The method as defined in claim 14 further comprising the steps of:

(a) maintaining a substantially constant tool inclination and azimuth at said locations;

(b) calculating the cross-axial interference from the measurements made at said locations; and (c) correcting the azimuth estimate at said locations using the calculated values of said cross-axial interference.

* * * * *